United States Patent [19]

Oehler

[11] 3,792,789

[45] Feb. 19, 1974

[54] LOAD TRANSPORT APPARATUS

[76] Inventor: Carl W. Oehler, 2309 S.E. 11th St., Ocala, Fla. 33670

[22] Filed: Oct. 20, 1971

[21] Appl. No.: 190,731

[52] U.S. Cl............... 214/390, 254/8 R, 214/515, 280/43.23, 280/425 A
[51] Int. Cl.............................................. B60p 1/64
[58] Field of Search . 214/390, 512, 506; 280/43.23, 280/43.11, 425 R, 425 A; 254/8 R, 8 C

[56] References Cited
UNITED STATES PATENTS

| | | | |
|---|---|---|---|
| 3,335,887 | 8/1967 | Snook | 214/506 |
| 3,271,042 | 9/1966 | Flodin | 280/43.23 |
| 3,039,633 | 6/1962 | Mindrum et al. | 214/390 |
| 3,442,409 | 5/1969 | Larson | 280/43.23 X |
| 3,635,492 | 1/1972 | Mauldin | 214/506 X |

*Primary Examiner*—Albert J. Makay
*Attorney, Agent, or Firm*—Oldham & Oldham Co.

[57] ABSTRACT

A load transport apparatus including a powered vehicle in combination with a trailer having connection means provided thereon at its forward end to engage with the powered vehicle. The trailer includes an elongate frame of low height and including a pair of side members and means securing said side members together only at the forward portion of the frame so that an opening is provided at the center rear portion of the frame and load support means are present on the frame members. A wheel means is pivotally carried by each of the side members at the rear end thereof and means are present for moving the wheel members from a low to a high operating position whereby the trailer can be moved under a load received between the side members and the wheels be moved to a high operating position to lift the load and ready the trailer for transport action.

1 Claim, 7 Drawing Figures

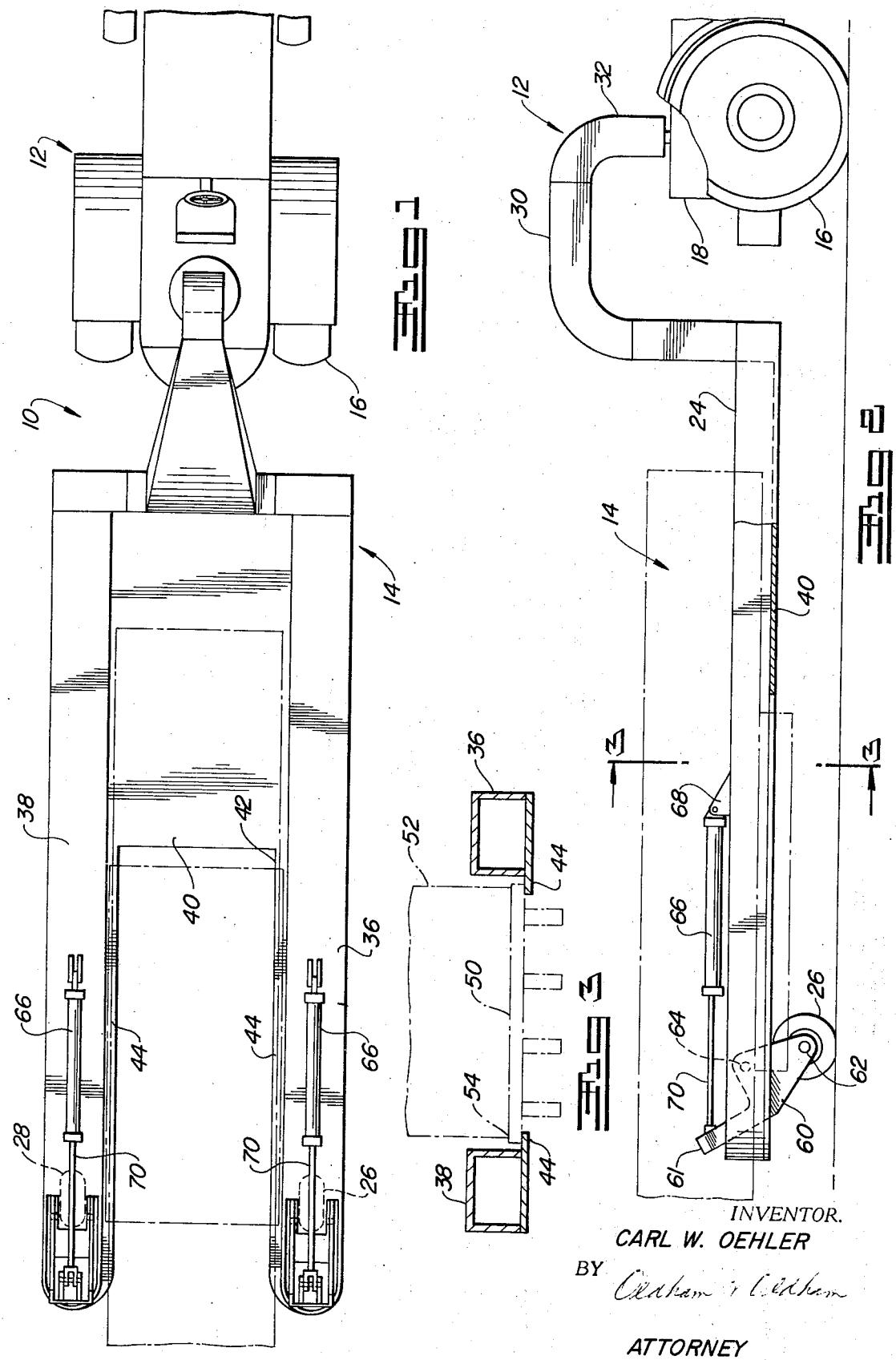

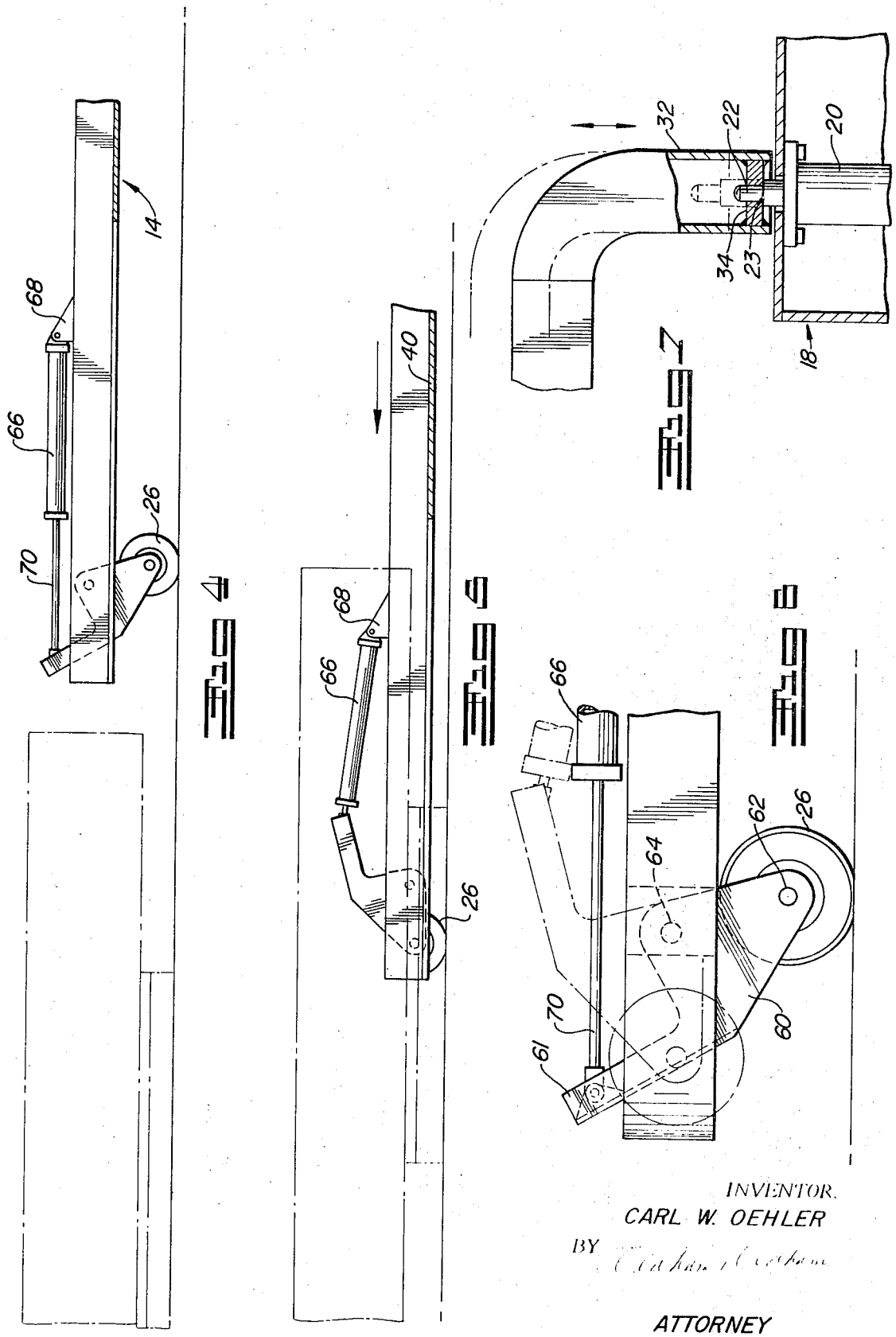

3,792,789

LOAD TRANSPORT APPARATUS

BACKGROUND OF THE INVENTION

This load transport apparatus is particularly suited for off the highway use, such as for engaging relatively heavy loads in a factory and moving the loads around in the factory from one location to another.

Heretofore two wheeled powered vehicles have been provided for towing trailers around in off highway uses of this type. Likewise pallets have been provided that are adapted to receive relatively elongate load members thereon that may protrude from the pallet an appreciable distance both forwardly and rearwardly of the pallet. The pallet has support shoulders extending laterally from the sides thereof for engaging a transport or trailer member. Insofar as I am aware such previous types of load transport means have not been satisfactory.

Loads may be applied to the pallet by a traveling crane, and the two wheeled or other vehicle and/or trailer may be engaged with each other by aid of a traveling crane if necessary.

The general object of the present invention is to provide a novel and improved load transport apparatus characterized by the ease of engaging a transport trailer with a load carried by a pallet and for raising of the trailer to engage the load for transport action.

Another object of the invention is to provide a two wheeled trailer particularly designed for operation in a low vertical height position as well as for load transport action when in a relatively high position, and for control of the height by adjustable wheel units.

Further objects of the invention are to provide an improved type of a trailer for transporting elongate heavy load members; to provide a novel wheel design on trailers to facilitate moving the trailer in a low reduced height condition as well as in a relatively high or elevated condition; to provide a load lifting action in a trailer when changing the operative position of a pair of wheels provided for supporting the rear end of a trailer; to provide a trailer with front end means adapted for engaging a towing vehicle; to provide the towing vehicle with means for engaging a trailer and wherein the vertical position of the load engaging means may be varied; to provide individually operated power means for controlling the vertical height or operating position of a pair of wheels individually mounted on a trailer; and to provide a special elongate trailer having a generally U-shape when looked at in plan and wherein the trailer has an opening in the rear center portion thereof for facilitating sliding or moving the trailer under a load supported on a pallet for operative association therewith.

The foregoing and other objects and advantages of the invention will be made more apparent as the specification proceeds.

Reference now is made to the accompanying drawings, wherein:

FIG. 1 is a plan view of load transport apparatus embodying the principles of the invention and with a load being indicated in phantom engaged with the transport apparatus;

FIG. 2 is a fragmentary side view of a portion of the apparatus of FIG. 1 with portions thereof being broken away;

FIG. 3 is a fragmentary section taken on line 3—3 of FIG. 2;

FIG. 4 is a fragmentary side elevation indicating one relationship of the trailer with a load to be engaged thereby;

FIG. 5 is a view similar to FIG. 4 with the trailer being shown in reduced height operating position and being moved under a load for engagement therewith;

FIG. 6 is a fragmentary enlarged side elevation of the wheel operating means of the trailer; and FIG. 7 is a side elevation partially broken away and shown in vertical section of a portion of the means used for engaging the trailer with the prime mover vehicle.

When referring to corresponding members shown in the drawings and referred to in the specification, corresponding numerals are used to facilitate comparison therebetween.

SUBJECT MATTER OF THE INVENTION

The invention, as one embodiment thereof relates to load transport apparatus comprising in combination a two wheeled powered vehicle having trailer connection means provided thereon and a trailer including an elongate frame of low height engagable with the vehicle by vehicle engaging means at the forward portion of the trailer frame. The trailer frame includes a pair of side members which are connected together only adjacent the forward portion of the frame and having a center opening extending a major portion of the length of the frame from the rear of the frame, load support means on the side members on the inner surfaces thereof, wheel means pivotally carried by each of the side members at their rear ends thereof, and means for moving the wheel means from a low to a high operating position so that when the trailer has the wheels in a low operating position the trailer side members can be moved in under a load supported on a pallet, the wheels can be elevated to high operating conditions and the load and pallet be lifted onto the trailer frame by such action for load transport by the apparatus.

Regarding the details of the apparatus shown in the accompanying drawings, a load transport apparatus is indicated as a whole by the numeral 10 and it can be considered to be the combination of a two wheeled vehicle, indicated as a whole by the numeral 12, and a trailer, indicated as a whole by the numeral 14. This vehicle 12 can be of other conventional or known designs, as desired, but use of a two wheeled vehicle is known and that is the type of a vehicle used customarily for off the road transport operations located within a plant and involving the transfer of relatively heavy loads distances within the plant confines. The vehicle 12 may be of any known design that has a suitable motor and other means thereon for load transport action and it is adapted to provide a seat for a driver or operator of the apparatus. Only one pair of support wheels 16 are shown in the drawing. This transport vehicle includes suitable frame means 18 which position a hydraulic or other power actuated cylinder 20 thereon. The cylinder 20 is on a vertical axis and has a support pin or plunger 22 extending upwardly therefrom which plunger can be changed in vertical position to change the vertical heighth of the front end of the trailer which operatively engages with such plunger 22.

The trailer 14 includes an elongate frame 24 of low height and a pair of individually positioned or supported wheels 26 and 28 at the rear end of the trailer. The trailer frame may have any desired attachment means provided thereon and a sturdy, somewhat gooseneck shape member 30 is suitably secured to the frame 24 and extends upwardly and forwardly therefrom terminating in a downwardly extending section 32 that includes an apertured end plate 34 at its lower end. The aperture in the lower end plate is adapted to receive the plunger 22 therein and a shoulder 23 is provided on the plunger to engage with the end plate for support action between trailer and vehicle.

The elongate frame 24 of the trailer is of a special construction and it includes a pair of beams, or sturdy side members 36 and 38 that are of low vertical height and with such side members only being secured together adjacent the front end of the trailer as by a front cross plate 40 suitably secured the side members and extending therebetween. Hence a relatively long opening 42 is formed at the rear center portion of the frame and is open in the direction extending rearwardly of the frame. The opening is for load receipt action as hereinafter described. Preferably the side members 36 and 38 each include an elongate longitudinally extending flange 44 that extends the length of the side members from the open rear end of the trailer up to the rear edge or end of the cross plate 40.

Normally the load transport apparatus is particularly designed for use in transporting loads positioned on the members, such as pallets indicated at 50, which pallets have any suitable load 52 thereon. The load 52 may comprise one or more relatively elongate metal plates or sheets and with the load extending forwardly and rearwardly from the pallet 50 on which it is positioned. The pallets include laterally extending, exposed support shoulders or a support floor 54 therein that, with the pallet, would form a member of a proper width as to be received between the side members 36 and 38 and with the flanges 44 being below the floor 54 of the pallet. The pallet may be of any suitable construction that will support the pallet in a vertical height relationship to the trailer 14 as indicated in FIG. 3 when the trailer is moved in under a pallet for engaging with the load and pallet for transport action.

As a feature of the invention, and in order to facilitate moving the trailer 14 around in a factory at a low transport or movable position as well as at an elevated or higher load transport position, the wheels 26 and 28 are individually and pivotally secured to the trailer 14 adjacent the rear end thereof. Specifically, each wheel is suitably journalled on an operating frame or lever 60 that is pivotally secured to an associated side member by a shaft 62. Each of these mounting frame or lever means 60 is pivotally secured to one of the side members adjacent the rear end thereof as by shaft 64. End section 61 of these mounting frames 60 extend in a generally vertical direction upwardly beyond the top portions of the side members 36 and 38 as shown in FIG. 6 and suitable power means connect to these end sections 61 to control the position of the individual wheel. In this instance, a power actuated cylinder 66 is pivotally secured to each of the side members as by a bracket 68 and with the piston rod 70 extending from the cylinder being in turn pivotally secured to the exposed part of the end sections 61. Suitable power means (not shown) connect to these cylinders to control the actuation thereof and usually conventional control means can be provided on the vehicle 12 and be coupled to the trailer for operation of the cylinders. The drawings, such as FIG. 5, clearly show that when the piston is actuated to retract the piston 70, the mounting frame 60 moves over a dead center position to position the individual wheels in their low height position. However, when a load is to be transported, then the cylinders 66 are actuated so as to force the mounting frames 60 to the position indicated in FIG. 6 at which time the trailer will be in elevated load transport position. By the actuation of these cylinders 66 the trailer 14 will engage the pallet 40 and lift it and any load thereon for transport action. The frames 60 hence are retained in either a wheel elevated or a wheel lowered position by the applied loads and by their positioning in the trailer.

It will be realized that any conventional means normally available in a factory, such as a traveling crane or other lift means, can be used for lifting the forward end of the trailer 14 so that the plunger 22 will suitably engage with the front end portion 32 of the trailer and engage the vehicle and trailer for load transport action. Likewise, if needed a traveling crane or other member can aid in moving the vehicle 12 into operating position for engaging the trailer 14 for transport action.

The apparatus of the invention is sturdy in design and can be built at relatively low cost. Previously load transport action of heavy loads placed upon pallets in factories has been very difficult and in many instances relatively complex machines such as a stradle vehicle has been required for moving these heavy, bulky loads around in factories. Such "stradle" type of vehicles have been costly to maintain and operate. Thus it is believed that an improved load transport system has been provided and this system may be considered to include the vehicle and trailer, or just the novel trailer of the invention since it can be used in combination with any type of a prime mover vehicle for load transport action. Hence the objects of the invention are achieved.

While one complete embodiment of the invention has been disclosed herein, it will be appreciated that modification of this particular embodiment of the invention may be restored to without departing from the scope of the invention as defined in the appended claims.

What is claimed is:

1. Load transport apparatus comprising in combination a powered vehicle having a trailer connection means provided thereon, and a trailer including an elongated frame of low height and including a pair of side members and means connecting said members together only at the forward portion of the frame, said frame being open between said side members for a major portion of the length of said frame, load support means on said side members on the inner surfaces thereof, a vehicle engaging means terminating in a downwardly directed section on the forward portion of said frame, a wheel means operably carried by each of said side members at the rear end thereof, means for moving said wheel means from a low to a high operating position whereby the trailer can be moved under a load received between said side members in the frame opening, the wheels can be moved to a high operating position, the load be lifted and be transported by the apparatus, said wheel moving means including lever arms by which the wheels are operatively connected to said trailer, and power means pivotally connecting to said lever arms to move said lever arms and wheels over a dead center position in moving from a low to a high operating position for the wheels, and means on said vehicle engage said section of the vehicle engaging means and can move the same and the trailer end vertically.

* * * * *